US010768908B1

(12) United States Patent
Wang et al.

(10) Patent No.: US 10,768,908 B1
(45) Date of Patent: Sep. 8, 2020

(54) WORKFLOW ENGINE TOOL

(71) Applicant: Microsoft Technology Licensing, LLC, Redmond, WA (US)

(72) Inventors: Yu Wang, Redmond, WA (US); Yu Hu, Redmond, WA (US); Haiyuan Cao, Bellevue, WA (US); Hui Su, Bellevue, WA (US); Jinchao Li, Redmond, WA (US); Xinying Song, Redmond, WA (US); Jianfeng Gao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

(21) Appl. No.: 16/285,180

(22) Filed: Feb. 25, 2019

(51) Int. Cl.
  *G06F 8/35* (2018.01)
  *G06F 16/901* (2019.01)
  *G06F 8/70* (2018.01)

(52) U.S. Cl.
  CPC .......... *G06F 8/35* (2013.01); *G06F 8/70* (2013.01); *G06F 16/9024* (2019.01)

(58) Field of Classification Search
  None
  See application file for complete search history.

(56) References Cited

U.S. PATENT DOCUMENTS

| 2008/0097816 | A1* | 4/2008 | Freire | G06Q 10/063 705/7.26 |
| 2010/0211420 | A1 | 8/2010 | Kodi et al. | |
| 2011/0276915 | A1* | 11/2011 | Freire | G06Q 10/00 715/772 |
| 2012/0095801 | A1* | 4/2012 | Freire | G06Q 10/063 705/7.26 |
| 2014/0282353 | A1* | 9/2014 | Jubran | G06F 8/00 717/101 |
| 2017/0060574 | A1* | 3/2017 | Malladi | G06F 8/70 |

(Continued)

FOREIGN PATENT DOCUMENTS

WO    2016057236  A1    4/2016

OTHER PUBLICATIONS

"AEther Programmatic", Retrieved From: https://aetherwiki.azurewebsites.net/articles/FeatureAreas/AetherProgrammatic.html, Retrieved on: Dec. 14, 2019, 4 Pages.

(Continued)

*Primary Examiner* — Qing Chen

(57) ABSTRACT

A workflow engine tool is disclosed that enables scientists and engineers to programmatically author workflows (e.g., a directed acyclic graph, "DAG") with nearly no overhead, using a simpler script that needs almost no modifications for portability among multiple different workflow engines. This permits users to focus on the business logic of the project, avoiding the distracting tedious overhead related to workflow management (such as uploading modules, drawing edges, setting parameters, and other tasks). The workflow engine tool provides an abstraction layer on top of workflow engines, introducing a binding function that converts a programming language function (e.g., a normal python function) into a workflow module definition. The workflow engine tool infers module instances and induces edge dependencies automatically by inferring from a programming language script to build a DAG.

19 Claims, 7 Drawing Sheets

(56) References Cited

U.S. PATENT DOCUMENTS

| | | | | |
|---|---|---|---|---|
| 2017/0063886 A1* | 3/2017 | Muddu | ................ | G06F 3/0484 |
| 2017/0091673 A1* | 3/2017 | Gupta | .................... | G06N 5/022 |
| 2017/0316202 A1* | 11/2017 | Roichman | ............... | G06F 21/54 |
| 2018/0007145 A1* | 1/2018 | Piechowicz | ............ | G06Q 50/01 |
| 2018/0053328 A1* | 2/2018 | Simonovic | ............ | G06T 11/206 |
| 2019/0197418 A1* | 6/2019 | Abutbul | .................... | G06F 9/54 |
| 2019/0197419 A1* | 6/2019 | Abutbul | ................ | G06N 20/00 |

OTHER PUBLICATIONS

"Airflow Tutorial", Retrieved From: https://airflow.apache.org/docs/stable/tutorial.html, Retrieved on: Dec. 14, 2019, 10 Pages.

"AEther: Sample Code: Module", Retrieved From: https://aetherwiki.azurewebsites.net/articles/AetherLibrary/samples/Module.html, Retrieved on: Dec. 14, 2019, 5 Pages.

"AEther: Updating Modules", Rertieved From: https://aetherwiki.azurewebsites.net/articles/FeatureAreas/Updating_Modules.html, Retrieved on: Dec. 14, 2019, 7 Pages.

Goel, Vineet, "Why Robinhood Uses Airflow", Retrieved From: https://robinhood.engineering/why-robinhood-uses-airflow-aed13a9a90c8, May 10, 2017, 5 Pages.

Stansbury, Dustin, "Beyond CRON: An Introduction to Workflow Management Systems", Retrieved From: https://medium.com/@dustinstansbury/beyond-cron-an-introduction-to-workflow-management-systems-19987afcdb5e, May 2, 2017, 4 Pages.

Stansbury, Dustin, "Going with the Flow: How Quizlet Uses Apache Airflow to Execute Complex Data Processing Pipelines", Retrieved From: https://medium.com/tech-quizlet/going-with-the-flow-how-quizlet-uses-apache-airflow-to-execute-complex-data-processing-pipelines-1ca546f8cc68, May 2, 2017, 3 Pages.

Stansbury, Dustin, "How Quizlet Uses Apache Airflow in Practice", Retrieved From: https://medium.com/@dustinstansbury/how-quizlet-uses-apache-airflow-in-practice-a903cbb5626d, May 2, 2017, 6 Pages.

Stansbury, Dustin, "Understanding Apache Airflow's Key Concepts", Retrieved From: https://medium.com/@dustinstansbury/understanding-apache-airflows-key-concepts-a96efed52b1a, May 2, 2017, 13 Pages.

Stansbury, Dustin, "Why Quizlet Chose Apache Airflow for Executing Data Workflows", Retrieved From: https://towardsdatascience.com/why-quizlet-chose-apache-airflow-for-executing-data-workflows-3f97d40e9571, May 2, 2017, 6 Pages.

"International Search Report and Written Opinion Issued in PCT Application No. PCT/US20/014688", dated Apr. 24, 2020, 11 Pages.

\* cited by examiner

```python
def prepare_data():
    """
    :return: <train_x, train_y, test_x, test_y>.
    :rtype: <npy, npy, npy, npy>.
    """
    digits = datasets.load_digits()
    n_samples = len(digits.images)
    data = digits.images.reshape((n_samples, -1))
    label = digits.target train_x, train_y = data[:n_samples // 2], label[:n_samples // 2]
    test_x, test_y = data[n_samples // 2:], label[n_samples // 2:]

return train_x, train_y, test_x, test_y def train(train_x, train_y, gamma):
    """
    :param train_x: training data input features
    :type train_x: <npy>.
    :param train_y: training data labels
    :type train_y: <npy>.
    :param gamma: SVM parameter gamma
    :type gamma: float.
    :return: <classifier>.
    :rtype: <pkl>.
    """
    classifier = svm.SVC(gamma=gamma)
    classifier.fit(train_x, train_y)
    return classifier def test(classifier, test_x, test_y):
    """
    :param classifier: trained model
    :type classifier: <pkl>.
    :param test_x: testing data input
    :type test_x: <npy>.
    :param test_y: testing data label
    :type test_y: <npy>.
    :return: <msg>.
    :rtype: <str>.
    """
    expected = test_y
    predicted = classifier.predict(test_x)
    msg = "Classification report for classifier %s:\n%s\n" % (classifier, metrics.classification_report(expected, predicted))
    msg += "Confusion matrix:\n%s" % metrics.confusion_matrix(expected, predicted)
    return msg
```

WORKFLOW ENGINE TOOL

BACKGROUND

In the era of big data and artificial intelligence (AI), intelligent use of data has become an important factor in the success of many businesses. Data often forms a foundation for advanced analytics, AI, and business operation efficiency. As more businesses become data-driven and data volume grows rapidly, there is an increasing need to manage and execute complicated data processing pipelines that extract data from various sources, transform it for consumption (e.g., extracting features and training AI models), and storing it for subsequent uses. Workflow engines are often used to manage data workflow pipelines at scale.

Despite the benefits of workflow engines, full utilization of workflow engines remains burdensome, due to steep learning curves and the effort needed to author complicated workflow pipelines. A directed acyclic graph (DAG) defines a workflow pipeline for exploiting data to produce some desired results. Typically, users (e.g., engineers and scientists) interact with a graphical user interface (GUI) to manually compose DAGs, or must learn a special syntax to generate DAGs programmatically. Neither of these approaches is natural or intuitive, and both are prone to error. Generating, adapting, and reviewing the generation of DAGs can introduce significant overhead effort when DAGs become large and complex.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

A workflow engine tool is disclosed that enables scientists and engineers to programmatically author workflows (e.g., a directed acyclic graph, "DAG") with nearly no overhead, using a simple script that needs almost no modifications for portability among multiple different workflow engines. This permits users to focus on the business logic of the project, avoiding the distracting tedious overhead related to workflow management (such as uploading modules, drawing edges, setting parameters, and other tasks). The workflow engine tool provides an abstraction layer on top of workflow engines, introducing a binding function that converts a programming language function (e.g., a normal python function) into a workflow module definition. The workflow engine tool infers module instances and induces edge dependencies automatically by inferring from a programming language script to build a DAG.

An example workflow engine tool comprises: a processor; a computer-readable medium storing instructions that are operative when executed by the processor to: extract module definitions from a programming language script; extract execution flow information from the programming language script; generate, for a first workflow engine, modules from the extracted module definitions; generate, for the first workflow engine, edges for connecting the modules generated for the first workflow engine; and connect the modules generated for the first workflow engine with the edges generated for the first workflow engine, based at least on the extracted execution flow information, to generate a first workflow pipeline for the first workflow engine.

BRIEF DESCRIPTION OF THE DRAWINGS

The disclosed examples are described in detail below with reference to the accompanying drawing figures listed below:

FIG. 2 shows an example workflow module authoring page;

FIG. 3 shows a portion of an example script used by the workflow engine tool of FIG. 1;

Corresponding reference characters indicate corresponding parts throughout the drawings.

DETAILED DESCRIPTION

Figure 1:
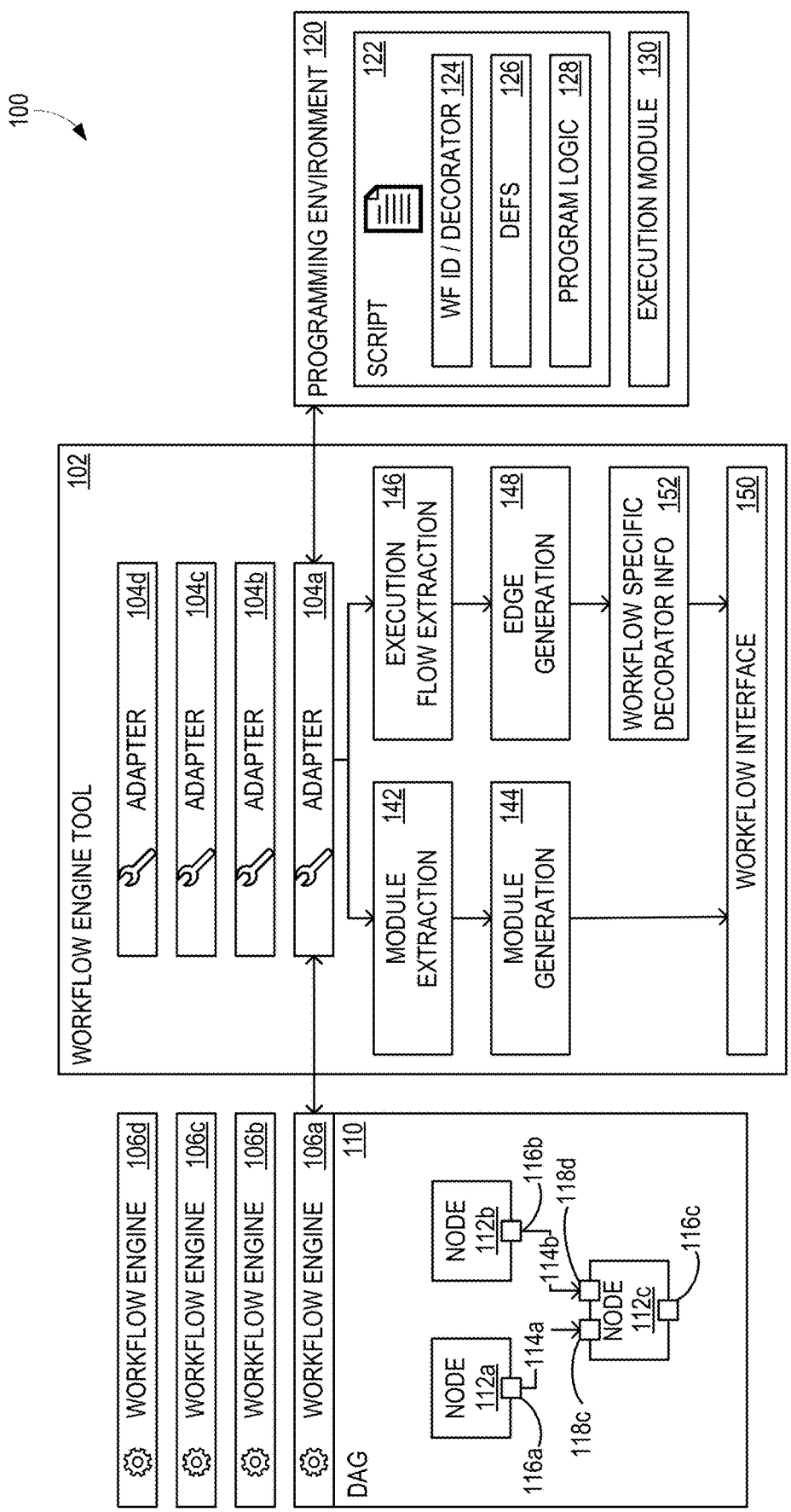
FIG. 1 illustrates an arrangement that can advantageously use an exemplary workflow engine tool.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

In the era of big data and artificial intelligence (AI), intelligent use of data has become an important factor in the success of many businesses. Data often forms a foundation for advanced analytics, AI, and business operation efficiency. As more businesses become data-driven and data volume grows rapidly, there is an increasing need to manage and execute complicated data processing pipelines that extract data from various sources, transform it for consumption (e.g., extracting features and training AI models), and store it for subsequent uses. Workflow engines are often used to manage data workflow pipelines at scale. A workflow consists of an orchestrated and repeatable pattern of business activity enabled by the systematic organization of resources into processes that transform materials, provide services, or process information, and can be depicted as a sequence of operations, the work of a person or group, the work of an organization of staff, or one or more simple or complex mechanisms. Flow may refer to a document, service, or product that is being transferred from one step to another.

Workflows may be viewed as one fundamental building block to be combined with other parts of an organization's structure such as information technology, teams, projects and hierarchies. The benefits of workflow management systems include:

managing dependencies between jobs;
orchestration across heterogeneous computing clusters;
transparency, reproducibility, reusability (sharing of modules and data), collaboration, rapid development;
failure handling, alerts, retrospection, and scheduling parity between offline experiments and online production;
visualization, monitoring, managing jobs; historical views of jobs; and
versioning, differencing, and source control Workflow in AI applications is typically a long, periodical batch process; AI engineering applications often contain numerous workflows, including data cleaning and processing, model training experiment, and metric dashboard generation. Typical types of workflow pipelines include:
data warehousing;
data infrastructure maintenance;
model training and experimentation;
online production; and
reporting and telemetry.

A directed acyclic graph (DAG) defines a workflow pipeline for exploiting data to produce some desired results. Typically, users (e.g., engineers and scientists) interact with a graphical user interface (GUI) to manually compose DAGs, or must learn a special syntax to generate DAGs programmatically. Neither of these approaches is natural or intuitive, and both are prone to error. Generating, adapting, and reviewing the generation of DAGs can introduce significant overhead effort when DAGs become large and complex. Manual creation of job modules requires specifying edges to connect modules into DAGs, which is tedious, labor-intense, and error-prone. Programmatic creation of a DAGs requires writing code, such as a script in a programming language such as C #, python, or another programming language. Although this saves the tedious work of drawing the graph by hand, it still requires users to write considerable amount of extra code, upload modules, connect nodes, etc., which is overhead to the core logic of the work. Additionally, the extra code is specific to a workflow engine, which not only adds the learning cost but also prevents reuse of the time investment with other workflow engines. Despite the benefits of workflow engines, full utilization of workflow engines remains burdensome, due to steep learning curves and the effort needed to author complicated workflow pipelines.

Therefore, a workflow engine tool is provided that enables scientists and engineers to programmatically author workflows (e.g., DAGs) with nearly no overhead, using a simpler script that needs almost no modifications for portability among multiple different workflow engines. This permits user to focus on the business logic of the project, avoiding the distracting tedious overhead related to workflow management (such as uploading modules, drawing edges, setting parameters, and other tasks). The workflow engine tool provides an abstraction layer on top of workflow engines, introducing a binding function that converts a programming language function (e.g., a normal python function) into a workflow module definition. The workflow engine tool infers module instances and induces edge dependencies automatically by inferring from a programming language script to build a DAG.

The workflow engine tool induces workflow graphs from a programming script (e.g., a python script) such that module definition is inferred from a function definition (e.g., a function definition including doc strings), including inducing inputs, parameters, and outputs. Module instances (tasks and nodes) are automatically detected and created from function calls in the script, and some examples involve generating unique module IDs from upstream dependencies and a module's own parameters. Edges and execution dependencies are inferred based on variables generated from one function call and fed as inputs and parameters into other functions. The workflow engine tool thus creates an abstraction layer that serves as a bridge between user's script and a target workflow engine. By implementing different versions of the abstraction layer, to adapt to various underlying workflow engines, the script can generate DAGs on multiple run different workflow engines without burdensome changes. By providing a dummy abstraction layer, the same script can even run in the absence of a workflow engine. Additionally, the workflow engine tool automatically resolves task and data dependency, handles data persistence caching natively, permits the same script to run locally and on a workflow cluster—for multiple different workflow engines. This eliminates the need to manually create DAGs or program in special APIs.

FIG. 1 illustrates an arrangement 100 that can advantageously use an exemplary workflow engine tool 102. Workflow engine tool 102 includes multiple adapters 104a-104d that correspond to multiple different workflow engines 106a-106d, permitting a common script 122 in programming environment 120 to run on any of multiple different workflow engines 106a-106d. It should be understood that, in some examples, a different number of workflow engines can be supported. In some examples, at least one of workflow engines 106b-106d is a dummy abstraction layer, permitting workflow engine tool 102 to run in the absence of a workflow engine. A DAG 110 is generated for workflow engine 106a, and includes nodes 112a-112c, along with edges 114a and 114b that connect outputs 116a and 116b, of nodes 112a and 112b respectively, with inputs 118c and 118d of node 112c. As illustrated, node 112c also has an output 116c.

A workflow DAG (e.g., DAG 110) consists of nodes (e.g., nodes 112a-112c) and directed edges (e.g., edges 114a and 114b). A node (e.g., a module) is a basic unit of task execution in a workflow. It can be a function, a script, or an executable program, corresponding to a single task defined by the user. Each node has zero or more inputs, zero or more parameters, and zero or more outputs. Inputs and outputs are the data passing from one node to another. Depending on the actual workflow engine design, the data exchanged can be in multiple different forms, such as memory objects, shared files, distributed files, and others. One node's output may become the input of another node, which at least partially dictates the execution dependency between nodes. For example, since node 112c has input 118c, which comes from output 116a of node 112a, then node 112c cannot be executed until node 112a has been successfully executed and produced output 116a. The dependency between nodes can be denoted as edges in the workflow DAG. A module may have multiple inputs and multiple outputs. Often, each input and output is associated with a unique name as its identifier.

A parameter is essential data that is needed for a particular execution run of a node, but yet is not output by another node. For example, a node for training an AI model may have parameters such as "number of epochs" or "learning rate". Both inputs and parameters are essential data that is needed for executing a node. The difference between inputs and parameters is that inputs are data that is generated dynamically by upstream nodes during the run, and therefore dictate execution flow dependency (edges) between nodes, whereas parameters are data that is not generated by upstream nodes, but is instead but specified by users prior to the run. Therefore, parameters do not affect the dependency between nodes. Often parameters are some simple values which can be easily specified. In some situations, the user has a choice of specifying data as an input or a parameter. For example, if data is complex, then even though it can be a parameter, a function may be written to generate it, therefore rendering the data into an input. Also, in some situations, input, output, and parameters may have enforced data types, such as integer, floating point number, string, date-time, or other pre-defined data types. In such situations, when an output is connected to an input, the data type should be consistent.

Edges are directed (directional, pointing from an output to an input), and therefore dictate at least some aspects of execution dependency between nodes (modules and tasks). The edges in a DAG must be defined such that a DAG is acyclic, in order to permit determination of execution order. Therefore, since node 112c has an input 118c that comes from output 116a of node 112a (through edge 114a), node 112a cannot have an input that depends (either directly, or through intervening modules) on output 116c of node 112c. In some examples, there could be multiple edges between two modules, because edges connect inputs to outputs, and the modules may each have multiple inputs or outputs. However, to prevent cyclical dependencies, all edges should have the same direction, in such situations. A single output may connect to multiple inputs, when data generated by one module is consumed by multiple other modules. However, an input of a module can come from only one source.

An execution of a DAG pipeline represents a particular run of the DAG. Parameters must be pre-specified before the DAG can be executed, and the DAG may also require some data from external data sources, which is brought in to the DAG by some loading modules. DAG runs are deterministic, meaning that, given the same input data and parameters, and final output will be consistent for multiple execution runs. In some circumstance, a workflow engine (e.g., workflow engine 106a) can cache intermediate results generated by successfully executed modules when the input dependency and parameters are not changed, so that during the next run, the cached results can be used in lieu of executing the module again. This can speed execution time for the DAG. For caching systems, changes to input are detected, so that the cached results are not improperly reused.

Programming environment 120 represents a generic programming environment, such as python or C #. An execution module 130 permits script 122, which is written in a high-level programming language, to execute. For line-by-line interpreted languages, for example, execution module 130 provides an executing virtual machine. In the illustrated example, programming environment 120 is a python environment. Script 122 is illustrated as including three parts: a workflow identifier and decorator 124, a function definition portion 126 (e.g., a function definition including doc strings), and a program logic portion 128. Python provides for a decorator, which is a function that takes another function and extends the behavior of the latter function without explicitly modifying it. In some examples, workflow identifier and decorator 124 is implemented as a "bind" function, which is a single line of line code to convert a function into a module definition that can be recognized and used in workflow engine. An example and further detail will be provided in reference to FIG. 5. Workflow identifier and decorator 124 enables workflow engine tool 102 to select a target one of adapters 104a-104d, so that workflow engine tool 102 can create different engine wrappers for different underlying workflow engines. This permits function definition portion 126 and program logic portion 128 to remain unchanged when any one of workflow engines 106a-106d is targeted. For clarity, components 142-152 will be described in relation to FIG. 5, after the descriptions of FIGS. 2 through 4.

FIG. 2 shows an example workflow module authoring page 200. Workflow module authoring page 200 is used for manually generating modules for DAGs and has multiple data fields for a user to complete. Workflow engine tool 102 is able to extract, infer, or otherwise generate information from script 122 that corresponds to multiple data fields in workflow module authoring page 200, thereby rendering workflow module authoring page 200 obsolete in various use case scenarios.

FIG. 3 shows a script portion 300 that provides function definitions for use with workflow engine tool 102, in which a user leverages workflow engine tool 102 to use normal programming language syntax to specify DAGs. Specifically, script portion 300 forms an example of function definition portion 126. The illustrated example of script portion 300 uses the following functions for an exemplary AI training and testing operation:

prepare_data( ), which loads a dataset, splits it into train and test portions, and returns training and testing data separately. This function takes no inputs or parameters, and generates four outputs.

train( ), which intakes training data (input and labels), trains a model, and returns the trained model. This function generates a trained model as an output and takes three arguments; the first two arguments are inputs and the third argument is a parameter.

test( ), which intakes the trained model and test data, predicts model outputs, and generates a classification report at the output.

The text of script portion 300 is:
def prepare_data( ):
"""
:return: <train_x, train_y, test_x, test_y>.
:rtype: <npy, npy, npy, npy>.
"""
digits=datasets.load_digits( )
n_samples=len(digits.images)
data=digits.images.reshape((n_samples, −1))
label=digits.target
train_x, train_y=data[:n_samples//2], label[:n_samples//2]
test_x, test_y=data[n_samples//2:], label[n_samples//2:]
return train_x, train, test_x, test_y
def train(train_x, train_y, gamma):
"""
:param train_x: training data input features
:type train_x: <npy>.
:param train_y: training data labels
:type train_y: <npy>.
:param gamma: SVM parameter gamma
:type gamma: float.
:return: <classifier>.
:rtype: <pkl>.
"""
classifier=svm.SVC(gamma=gamma)
classifier.fit(train_x, train_y)
return classifier
def test(classifier, test_x, test_y):
"""
:param classifier: trained model
:type classifier: <pkl>.
:param test_x: testing data input
:type test_x: <npy>.

:param test_y: testing data label
:type test_y: <npy>.
:return: <msg>.
:rtype: <str>.
"""
expected=test_y
predicted=classifier.predict(test_x)
msg="Classification report for classifier % s:\n % s\n\n"
    % (classifier, metrics.classification_report(expected, predicted))
msg+="Confusion matrix:\n%s" % metrics.confusion_matrix(expected, predicted) return msg The function parameters correspond to module inputs and module parameters, because they are the data needed for a function to run in a general programming environment and a module to run in a workflow environment. Function also have returns, which correspond to the module outputs. Workflow engine tool 102 frees up the users from having to manually specify inputs, parameters, and outputs of module, by extracting this data from script portion 300. For example, the function definitions include doc strings that specify: (1) which function parameters are module inputs, (2) which function parameters are the module parameters, and (3) what the function returns as the module output or outputs.

For example, prepare_data( ) uses
:return: <train_x, train_y, test_x, test_y>.
:rtype: <npy, npy, npy, npy>.

to specify four outputs of type npy, named train_x, train_y, test_x, and test_y. The function train( ) uses a doc string to define inputs train_x and train_y, as the same npy data type as the train_x and train_y outputs of prepare_data( ), and also an output of type pkl, named classifier. This permits generating an edge connecting the output based on train_x of the module that corresponds to prepare_data( ) to the input based on train_x of the module that corresponds to train( ). A similar edge is generated using the inputs and outputs based on train_y for the same modules. The function test( ) uses a doc string to define inputs test_x and test_y, as the same npy data type as the test_x and test_y outputs of prepare_data( ), and an input named classifier, of the same pkl data type as the output of train( ) that uses the same name. This permits generating three edges, two going from the outputs of the module corresponding to prepare_data( ) to inputs of the module corresponding to test( ), and one going from the outputs of the module corresponding to train( ) to a third input of the module corresponding to test( ).

The function test( ) must execute after both prepare_data( ) and train( ), and train( ) must execute after prepare_data( ). This means that the order of execution is prepare_data( ), then train( ), and then test( ). Workflow engine tool 102 extracts this information in order to generate modules with the correct inputs, parameters, and outputs, and then generate edges to connect the modules.

Figures 4, 5:
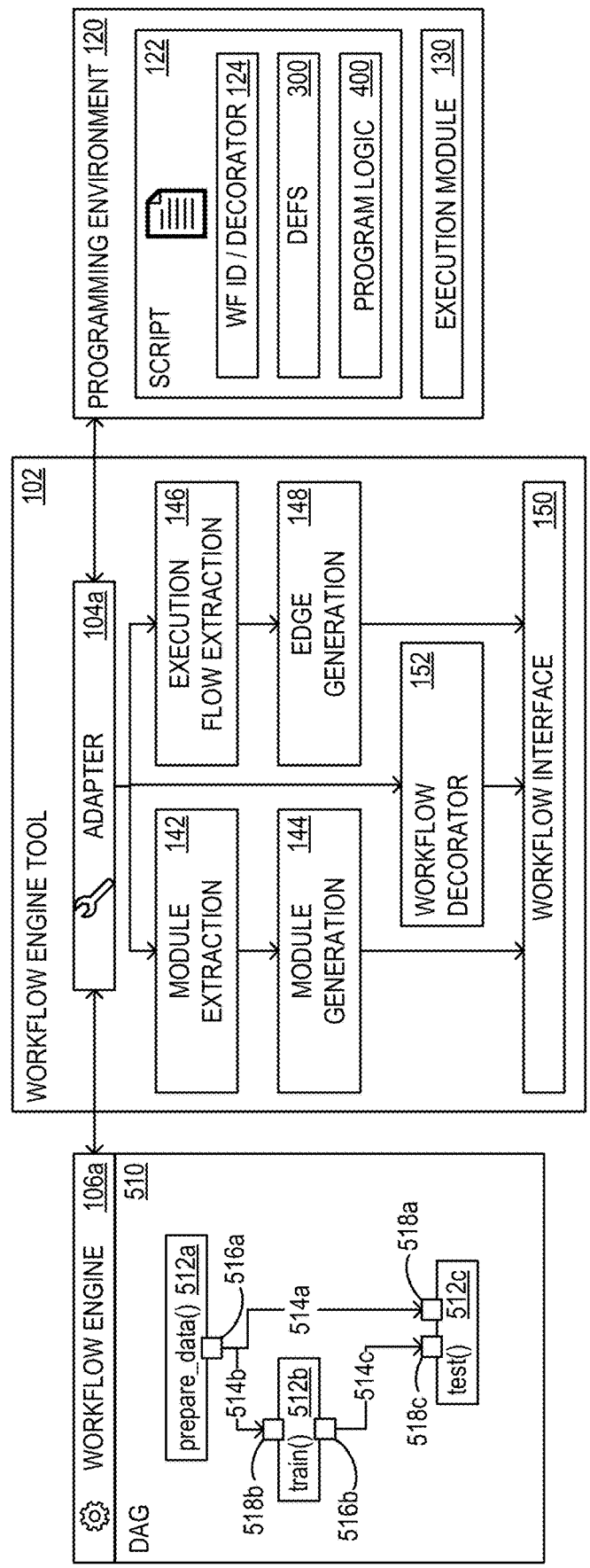
FIG. 4 shows another portion of the example script of FIG. 3.
FIG. 5 illustrates intermediate results of the workflow engine tool of FIG. 1 operating on the script shown in FIGS. 3 and 4.

FIG. 4 shows a script portion 400 that may be combined with script portion 300 for use with workflow engine tool 102. Specifically, script portion 400 provides program logic that advantageously uses the function definitions provided in script portion 300, and forms an example of program logic portion 128. The illustrated example of script portion 400 uses the above-described functions for the exemplary AI training and testing operation:

train_x, train_y, test_x, test_y=prepare_data( )
classifier=train(train_x, train_y, 0.001)
res=test(classifier, test_x, test_y).

This example program (comprising script portions 300 and 400) loads data, separates it into training and testing portion, trains with the training data, tests with the testing data, and returns a report. At this point, with this example, execution flow can be inferred (extracted).

FIG. 5 illustrates intermediate results of workflow engine tool 102 operating on a script 522. In this example, a script 522 includes script portions 300 and 400 (of FIGS. 3 and 4, respectively), along with workflow identifier and decorator 124 that specifies adapter 104*a* (for workflow engine 106*a*) and invokes a python decorator to convert the defined functions into workflow module definitions. One example of workflow identifier and decorator 124 is:

lf_a=LightflowEngine( )
prepare_data, train, test=lf_a.bind_functions(prepare_data, train, test).

Figure 6:
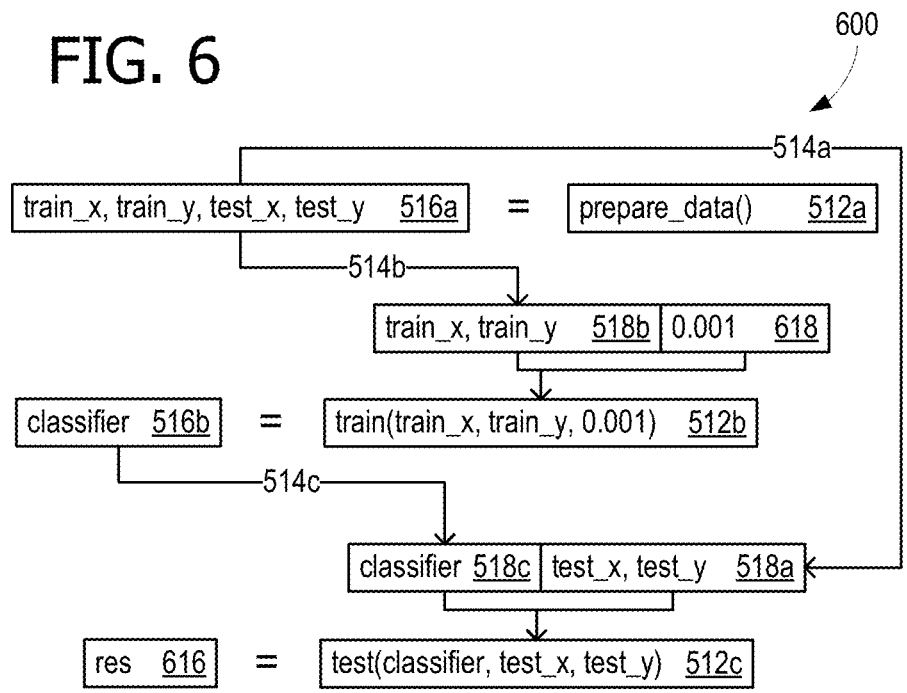
FIG. 6 illustrates extraction of information in various data fields, by the workflow engine tool of FIG. 1.

A DAG 510 has a node 512*a* that corresponds to the prepare_data( ) function described above, a node 512*b* that corresponds to the train( ) function described above, and a node 512*c* that corresponds to the test( ) function described above. Additionally, edges are illustrated between the nodes. For simplicity of illustration, edges 514*a* and 514*b* are shown as single edges, although there would be two of each, to match the four values outputs of node 512*a* (train_x, train_y, test_x, and test_y), which is shown as a single output 516*a*, for clarity of illustration. Specifically edge 514*a* connects test_x, and test_y from output 516*a* to an input 518*a* (there would actually be two) of node 512*c*; edge 514*b* connects train_x, and train_y from output 516*a* to an input 518*b* (there would actually be two) of node 512*b*; and edge 514*c* connects classifier from output 516*b* of node 512*b* to an input 518*c* of node 512*c*. This is illustrated in FIG. 6, along with a parameter 618 for node 512*b*, and an output 616 from node 512*c*.

Returning to FIG. 5, components 142-152, which perform the information extraction, and module and edge generation activities, are described. A module extraction component 142 uses the function definitions in script 522 (e.g., script portion 300) to extract information used by a module generation component 144 to generate modules (e.g., nodes 512*a*-512*c*). When the modules are created, they will need label, or a module ID, in order to be addressed and handled by workflow engine 106*a*. One way to generate module IDs, for assigning to nodes 512*a*-512*c*, is to use upstream dependencies. For example, node 512*a* is upstream from both of nodes 512*b* and 512*c*, and node 512*b* is upstream from node 512*c*. A module ID can then be generated for node 512*c* using information from nodes 512*a* and 512*c*, for example by combining their module IDs and passing them through a function that is unlikely to produce collisions for module IDs. A workflow interface component 150 sends the generated modules to workflow engine 106*a*. An execution flow extraction component 146 uses the input and output information to extract execution flow information, and an edge generation component 148 generates edges (e.g., edges 514*a*-514*c*) that connect outputs (e.g., outputs 516*a* and 516*b*) with inputs (e.g., inputs (518*a*-518*c*) of the modules generated by module generation component 144. Workflow interface component 150 sends the generated modules to workflow engine 106*a*. A workflow decorator component 152 binds the functions according to the specific workflow engine targeted (e.g., workflow engine 106*a*), so that DAG 510 can be generated. Workflow interface component 150 executes the DAG 510 and the underlying system calls for workflow engine 106*a*.

In some examples, a series of function calls can be grouped into a more complex structure, for example by creating sub-graphs and using the sub-graphs in a top-level workflow pipeline. An example abbreviated script, using the previously-identified functions is:

```
def sub_dag(classifier, train_x, train_y, test_x, test_y):
    classifier=train(train_x, train_y, 0.001)
    test(classifier, test_x, test_y)
    return classifier
train_x, train_y, test_x, test_y=prepare_data( )
classifier=sub_dag(classifier, train_x, train_y, test_x, test_y)
```

Additionally, in some examples DAGs can be created as needed, based on conditional branching logic, such as if-then branching and for-loops—subject to the information necessary to compiling a DAG being available at the time the information is to be extracted from the script. The decorator functionality permits the use of workflow-specific functionality, identified in some parameters. For example, some workflows may support a mode specification, according to the following example modification of script portion 400 (of FIG. 4):

```
train_x, train_y, test_x, test_y=prepare_data(mode='cpu')
classifier=train(train_x, train_y, 0.001, mode='gpu')
res=test(classifier, test_x, test_y, mode='gpu')
```

When workflow engine tool 102 reads the additional parameters, it will recognize them as work-flow specific parameters, based on the original parameters of the module functions in the doc string. To enable script 522 to run anywhere with or without a workflow engine that supports the additional parameters, a dummy wrapper binds the functions, but eliminates the additional parameters and passes only the original parameters to the original function. In this way, by just changing one line, script 522 could run normally without any further changes.

Figure 7:
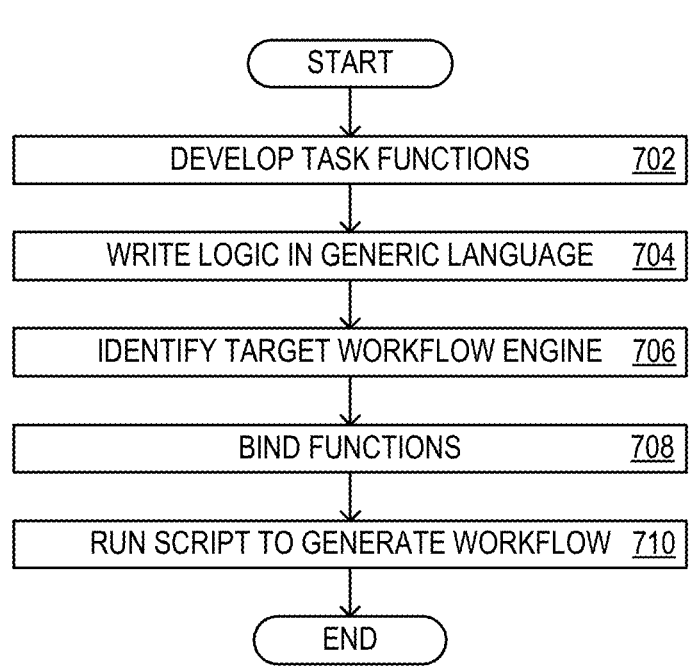
FIG. 7 is a flowchart of operations associated with operating the workflow engine tool of FIG. 1.

FIG. 7 is a flowchart 700 of operations associated with operating workflow engine tool 102. As described, workflow engine tool 102 drastically simplifies workflow generation for users. Rather than manually creating modules (e.g., using a workflow module authoring page 200 for each module), and then manually connecting the modules, a user merely needs to perform operations 702 through 710, as illustrated. In operation 702, the user develops task functions, including doc string definitions, producing an equivalent of script portion 300 (of FIG. 3). In operation 704, the user writes the program logic in a generic programming language, producing an equivalent of script portion 400 (of FIG. 4). In operation 706, the user identifies the target workflow engine, and binds the functions, using workflow identifier and decorator 124, in operation 708. This permits the user to generate a workflow, merely by running the script, in operation 710.

Figure 8:
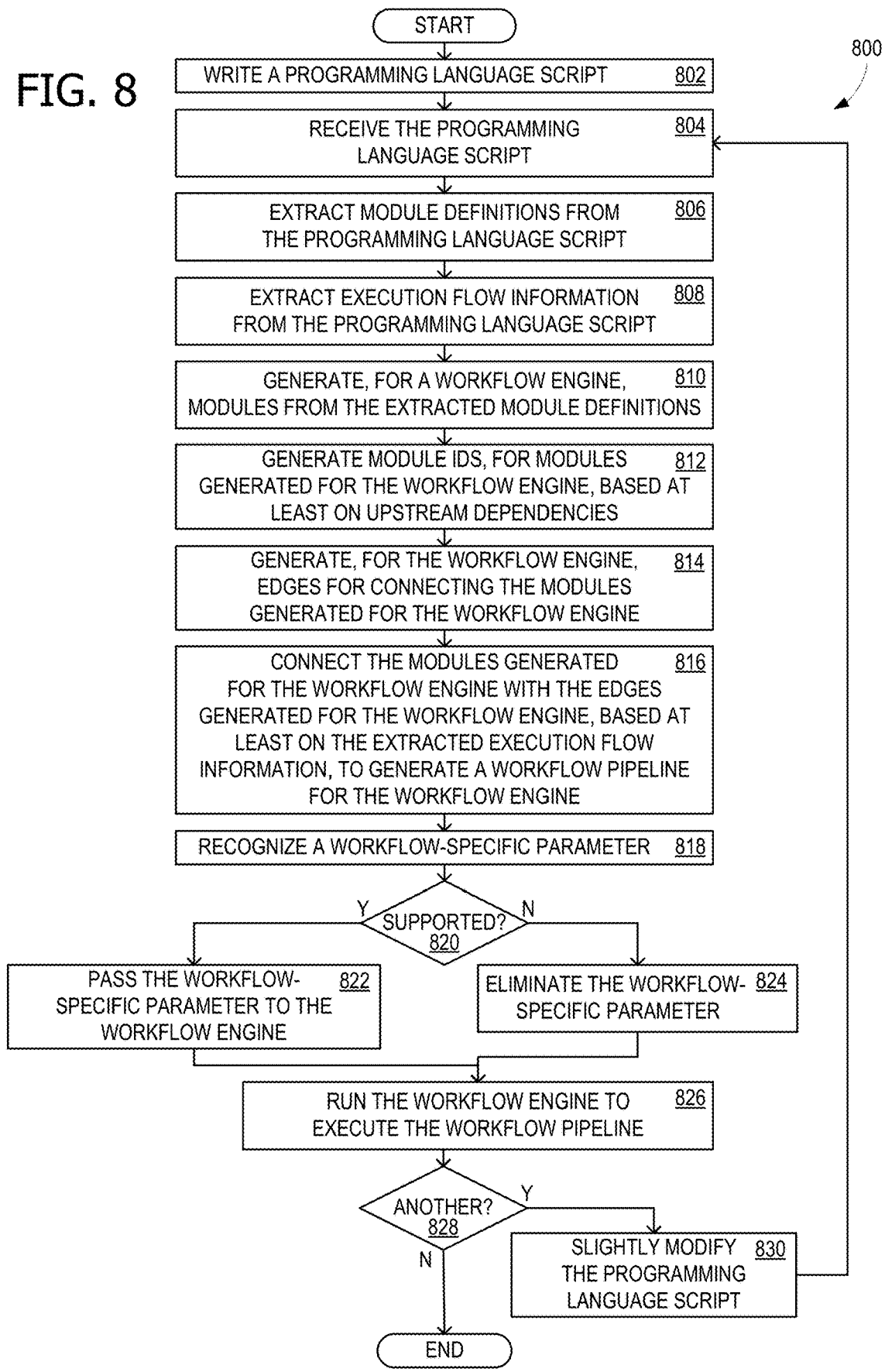
FIG. 8 is another flowchart of operations associated with operating the workflow engine tool of FIG. 1.

FIG. 8 is a flowchart 800 of operations associated with operating workflow engine tool 102. In some examples, the following operations are implemented as computer-executable instructions stored on and executed by computing device 900. Operation 802 includes writing a programming language script in a programming environment. In some examples, the programming language includes a python programming language and the programming language script is a python script. In some examples, C # is used. Operation 804 includes a workflow engine tool receiving the programming language script. Operation 806 includes extracting module definitions from the programming language script, and operation 808 includes extracting execution flow information from the programming language script. Operation 810 then includes generating, for the workflow engine, modules from the extracted module definitions. In some examples, this includes using a binding function. Operation 812 includes generating module IDs, for modules generated for the workflow engine, based at least on upstream dependencies.

Operation 814 includes generating, for the workflow engine, edges for connecting the modules generated for the workflow engine, and operation 816 includes connecting the modules generated for the workflow engine with the edges generated for the workflow engine, based at least on the extracted execution flow information, to generate a workflow pipeline for the workflow engine. In some examples, the workflow pipeline comprises a DAG. Operation 818 includes recognizing a workflow-specific parameter. If the targeted workflow engine is supported, as determined by decision operation 820, then operation 822 includes passing the workflow-specific parameter to the workflow engine. Otherwise, operation 824 eliminates the workflow-specific parameter, and does not pass it. Operation 826 then includes running the workflow engine to execute the workflow pipeline.

If, in decision operation 828, it is determined that another, different workflow engine is to be used with the programming language script, then operation 830 includes slightly modifying the programming language script for the second workflow engine. In some examples, this is as simple as modifying a single line (e.g., workflow identifier and decorator 124 in FIGS. 1 and 5) and then flowchart 800 returns to operation 804, where the workflow engine tool receiving the slightly modified programming language script.

Additional Examples

Some aspects and examples disclosed herein are directed to a workflow engine tool comprising: a processor; a computer-readable medium storing instructions that are operative when executed by the processor to: extract module definitions from a programming language script; extract execution flow information from the programming language script; generate, for a first workflow engine, modules from the extracted module definitions; generate, for the first workflow engine, edges for connecting the modules generated for the first workflow engine; and connect the modules generated for the first workflow engine with the edges generated for the first workflow engine, based at least on the extracted execution flow information, to generate a first workflow pipeline for the first workflow engine.

Additional aspects and examples disclosed herein are directed to a process for workflow engine management comprising: extracting module definitions from a programming language script; extracting execution flow information from the programming language script; generating, for a first workflow engine, modules from the extracted module definitions; generating, for the first workflow engine, edges for connecting the modules generated for the first workflow engine; and connecting the modules generated for the first workflow engine with the edges generated for the first workflow engine, based at least on the extracted execution flow information, to generate a first workflow pipeline for the first workflow engine.

Additional aspects and examples disclosed herein are directed to one or more computer storage devices having computer-executable instructions stored thereon for workflow engine management, which, on execution by a computer, cause the computer to perform operations comprising: extracting module definitions from a programming language script; extracting execution flow information from the programming language script; generating, for a first workflow engine, modules from the extracted module definitions;

generating, for the first workflow engine, edges for connecting the modules generated for the first workflow engine; connecting the modules generated for the first workflow engine with the edges generated for the first workflow engine, based at least on the extracted execution flow information, to generate a first workflow pipeline for the first workflow engine; generating, for a second workflow engine, modules from the extracted module definitions; generating, for the second workflow engine, edges for connecting the modules generated for the second workflow engine; and connecting the modules generated for the second workflow engine with the edges generated for the second workflow engine, based at least on the extracted execution flow information, to generate a second workflow pipeline for the second workflow engine.

Alternatively, or in addition to the other examples described herein, examples include any combination of the following:
- the programming language includes a python programming language;
- the first workflow pipeline comprises a DAG;
- running the first workflow engine to execute the first workflow pipeline;
- generating, for a second workflow engine, modules from the extracted module definitions; generating, for the second workflow engine, edges for connecting the modules generated for the second workflow engine; and connecting the modules generated for the second workflow engine with the edges generated for the second workflow engine, based at least on the extracted execution flow information, to generate a second workflow pipeline for the second workflow engine;
- the second workflow pipeline comprises a DAG;
- running the second workflow engine to execute the second workflow pipeline;
- recognizing a workflow-specific parameter; and based at least on whether the first workflow engine supports the workflow-specific parameter, passing the workflow-specific parameter to the first workflow engine;
- generating module IDs, for modules generated for the first workflow engine, based at least on upstream dependencies; and
- generating module IDs, for modules generated for the second workflow engine, based at least on upstream dependencies.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
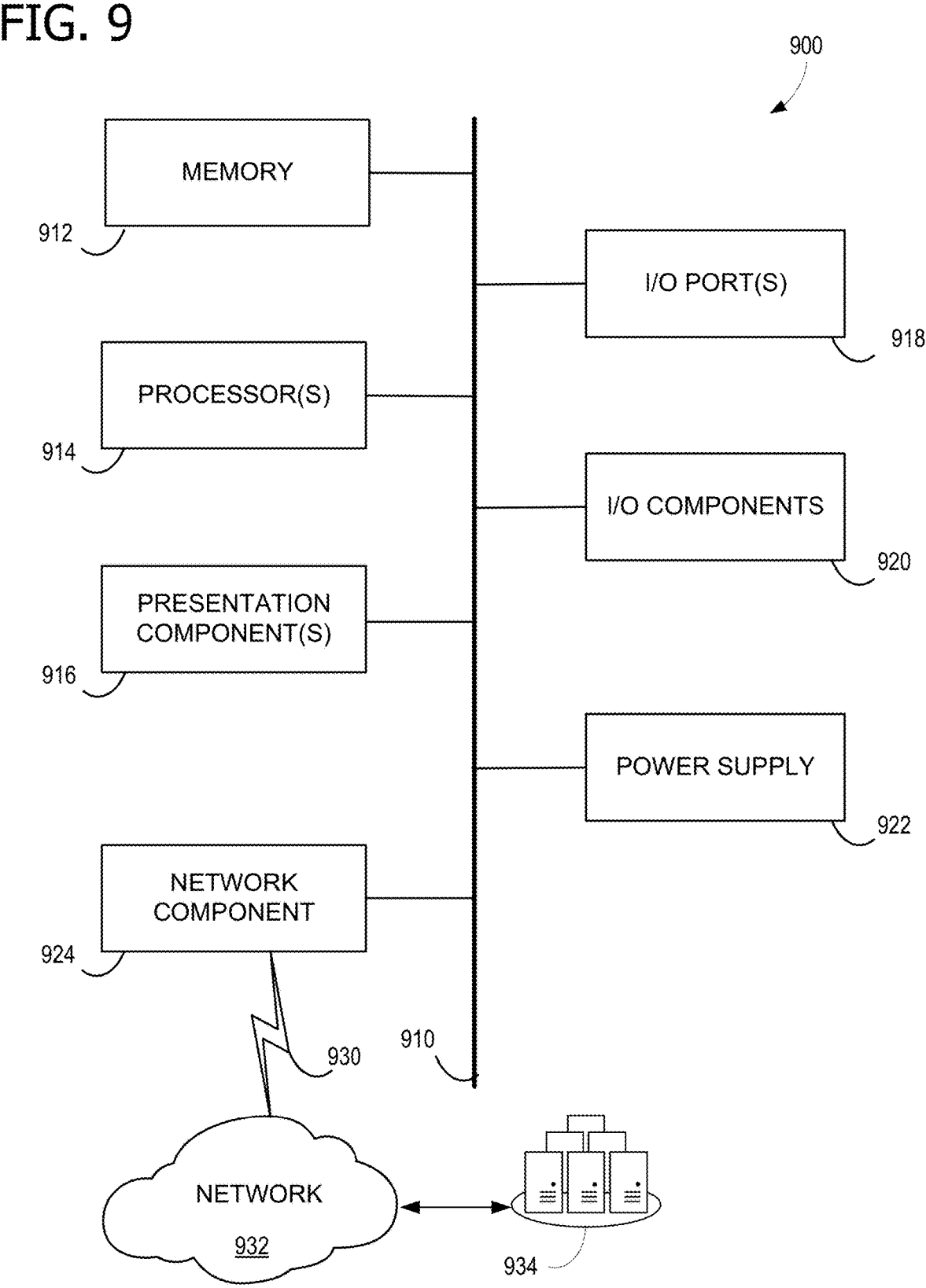
FIG. 9 is a block diagram of an example computing environment suitable for implementing some of the various examples disclosed herein.

FIG. 9 is a block diagram of example computing device 900 for implementing aspects disclosed herein, and is designated generally as computing device 900. Computing device 900 is but one example of a suitable computing environment and is not intended to suggest any limitation as to the scope of use or functionality of the examples disclosed herein. Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices and components: computer-storage memory 912, one or more processors 914, one or more presentation components 916, input/output (I/O) ports 918, I/O components 920, a power supply 922, and a network component 924. Computing device 900 should not be interpreted as having any dependency or requirement related to any single component or combination of components illustrated therein. While computing device 900 is depicted as a seemingly single device, multiple computing devices 900 may work together and share the depicted device resources. For instance, memory 912 may be distributed across multiple devices, processor(s) 914 may provide housed on different devices, and so on.

Bus 910 represents what may be one or more busses (such as an address bus, data bus, or a combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 9 is merely illustrative of an exemplary computing device that can be used in connection with one or more disclosed examples. Distinction is not made between such categories as "workstation," "server," "laptop," "hand-held device," etc., as all are contemplated within the scope of FIG. 9 and the references herein to a "computing device." Memory 912 may take the form of the computer-storage media references below and operatively provide storage of computer-readable instructions, data structures, program modules and other data for computing device 900. For example, memory 912 may store an operating system, a universal application platform, or other program modules and program data. Memory 912 may be used to store and access instructions configured to carry out the various operations disclosed herein.

As mentioned below, memory 912 may include computer-storage media in the form of volatile and/or nonvolatile memory, removable or non-removable memory, data disks in virtual environments, or a combination thereof. Memory 912 may include any quantity of memory associated with or accessible by computing device 900. Memory 912 may be internal to computing device 900 (as shown in FIG. 9), external to computing device 900 (not shown), or both (not shown). Examples of memory 912 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 900. Additionally, or alternatively, memory 912 may be distributed across multiple computing devices 900, e.g., in a virtualized environment in which instruction processing is carried out on multiple computing devices 900. For the purposes of this disclosure, "computer storage media," "computer-storage memory," "memory," and "memory devices" are synonymous terms for memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within computing device 900, or by a processor external to computing device 900. In some examples, processor(s) 914 are programmed to execute instructions such as those illustrated in the flowcharts discussed below and depicted in the accompanying drawings. Moreover, in some examples, processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. Ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. For example, network component 924 communicates over communication link 930 with network 932 with a cloud resource 934. Various examples of communication link 930 include a wireless connection, a wired connection, and/or a dedicated link, and in some examples, at least a portion is routed through the internet. In some examples, cloud resource 934 performs at least some of the operations described herein for computing device 900.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A workflow engine tool comprising:
a processor; and
a computer storage medium storing instructions that are operative when executed by the processor to:
receive a programming language script;
extract module definitions from the programming language script;
extract execution flow information from the programming language script;
generate, for a first workflow engine, modules from the extracted module definitions from the programming language script;
generate module IDs, for the modules generated for the first workflow engine, based at least on upstream dependencies;
generate, for the first workflow engine, edges for connecting the modules generated for the first workflow engine;
connect the modules generated for the first workflow engine with the edges generated for connecting the modules generated for the first workflow engine, based at least on the extracted execution flow information from the programming language script, to generate a first workflow pipeline for the first workflow engines;
recognize a workflow-specific parameter;
based at least on whether the first workflow engine supports the workflow-specific parameter, pass the workflow-specific parameter to the first workflow engine; and
run the first workflow engine to execute the first workflow pipeline.

2. The workflow engine tool of claim 1, wherein the programming language script includes a python programming language script.

3. The workflow engine tool of claim 1, wherein the first workflow pipeline comprises a directed acyclic graph (DAG).

4. The workflow engine tool of claim 1, wherein the instructions are further operative when executed by the processor to:
generate, for a second workflow engine, modules from the extracted module definitions from the programming language script;
generate, for the second workflow engine, edges for connecting the modules generated for the second workflow engine; and
connect the modules generated for the second workflow engine with the edges generated for connecting the modules generated for the second workflow engine, based at least on the extracted execution flow information from the programming language script, to generate a second workflow pipeline for the second workflow engine.

5. The workflow engine tool of claim 1, wherein extracting the module definitions from the programming language script further comprises:
inferring a module definition from a function definition.

6. The workflow engine tool of claim 1, wherein the first workflow engine is a dummy abstraction layer permitting the first workflow pipeline to run in the absence of a workflow engine.

7. The workflow engine tool of claim 1, wherein the first workflow engine is configured to cache intermediate results generated by one or more of the modules upon successful execution of the one or more of the modules, and wherein the cached intermediate results are used in lieu of executing the one or more of the modules in a subsequent run.

8. The workflow engine tool of claim 1, wherein passing the workflow-specific parameter to the first workflow engine further comprises:
binding the extracted module definitions from the programming language script with a dummy wrapper that eliminates one or more work-flow specific parameters and passes original parameters to original functions.

9. A method of workflow engine management, the method comprising:
receiving a programming language script;
extracting module definitions from the programming language script;
extracting execution flow information from the programming language script;
generating, for a first workflow engine, modules from the extracted module definitions from the programming language script;
generating module IDs, for the modules generated for the first workflow engine, based at least on upstream dependencies;
generating, for the first workflow engine, edges for connecting the modules generated for the first workflow engine;
connecting the modules generated for the first workflow engine with the edges generated for connecting the modules generated for the first workflow engine, based at least on the extracted execution flow information from the programming language script, to generate a first workflow pipeline for the first workflow engines;
recognizing a workflow-specific parameter;
based at least on whether the first workflow engine supports the workflow-specific parameter, passing the workflow-specific parameter to the first workflow engine; and
running the first workflow engine to execute the first workflow pipeline.

10. The method of claim 9, wherein the programming language script includes a python programming language script.

11. The method of claim 9, wherein the first workflow pipeline comprises a directed acyclic graph (DAG).

12. The method of claim 9, further comprising:
generating, for a second workflow engine, modules from the extracted module definitions from the programming language script;
generating, for the second workflow engine, edges for connecting the modules generated for the second workflow engine; and
connecting the modules generated for the second workflow engine with the edges generated for connecting the modules generated for the second workflow engine, based at least on the extracted execution flow information from the programming language script, to generate a second workflow pipeline for the second workflow engine.

13. The method of claim 9, wherein extracting the module definitions from the programming language script further comprises:
inferring a module definition from a function definition.

14. The method of claim 9, wherein the first workflow engine is a dummy abstraction layer permitting the first workflow pipeline to run in the absence of a workflow engine.

15. The method of claim 9, wherein the first workflow engine is configured to cache intermediate results generated by one or more of the modules upon successful execution of the one or more of the modules, and wherein the cached intermediate results are used in lieu of executing the one or more of the modules in a subsequent run.

16. The method of claim 9, wherein passing the workflow-specific parameter to the first workflow engine further comprises:
binding the extracted module definitions from the programming language script with a dummy wrapper that eliminates one or more work-flow specific parameters and passes original parameters to original functions.

17. One or more computer storage media having computer-executable instructions stored thereon for workflow engine management, which, on execution by a computer, cause the computer to perform operations comprising:
receiving a programming language script;
extracting module definitions from the programming language script;
extracting execution flow information from the programming language script;
generating, for a first workflow engine, modules from the extracted module definitions from the programming language script;
generating module IDs, for the modules generated for the first workflow engine, based at least on upstream dependencies;
generating, for the first workflow engine, edges for connecting the modules generated for the first workflow engine;
connecting the modules generated for the first workflow engine with the edges generated for connecting the modules generated for the first workflow engine, based at least on the extracted execution flow information from the programming language script, to generate a first workflow pipeline for the first workflow engine;
generating, for a second workflow engine, modules from the extracted module definitions from the programming language script;
generating module IDs, for the modules generated for the second workflow engine, based at least on upstream dependencies;
generating, for the second workflow engine, edges for connecting the modules generated for the second workflow engine;
connecting the modules generated for the second workflow engine with the edges generated for connecting the modules generated for the second workflow engine, based at least on the extracted execution flow information from the programming language script, to generate a second workflow pipeline for the second workflow engine;
recognizing a workflow-specific parameter;
based at least on whether the first workflow engine supports the workflow-specific parameter, passing the workflow-specific parameter to the first workflow engine;
based at least on whether the second workflow engine supports the workflow-specific parameter, passing the workflow-specific parameter to the second workflow engine; and
running the first and second workflow engines to execute the first and second workflow pipelines, respectively.

18. The one or more computer storage media of claim 17, wherein the programming language script includes a python programming language script.

19. The one or more computer storage media of claim 17, wherein the first and second workflow pipelines each comprises a directed acyclic graph (DAG).

* * * * *